(12) United States Patent
Lai et al.

(10) Patent No.: US 11,121,931 B2
(45) Date of Patent: Sep. 14, 2021

(54) METHOD AND APPARATUS FOR PERFORMING DYNAMIC STATISTICAL PERIOD ADJUSTMENT REGARDING RATE ADAPTION

(71) Applicant: Realtek Semiconductor Corp., HsinChu (TW)

(72) Inventors: Wei-Chi Lai, HsinChu (TW); Wei-Hsuan Chang, HsinChu (TW); Yu-Nan Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/985,191

(22) Filed: Aug. 4, 2020

(65) Prior Publication Data

US 2021/0258228 A1    Aug. 19, 2021

(30) Foreign Application Priority Data

Feb. 19, 2020 (TW) .................................. 109105330

(51) Int. Cl.
*H04L 12/24* (2006.01)
*H04L 1/00* (2006.01)
*H04L 12/26* (2006.01)

(52) U.S. Cl.
CPC .......... *H04L 41/142* (2013.01); *H04L 1/0002* (2013.01); *H04L 43/0894* (2013.01); *H04L 43/16* (2013.01)

(58) Field of Classification Search
CPC . H04L 41/142; H04L 1/0002; H04L 43/0894; H04L 43/16; H04N 21/43637
See application file for complete search history.

(56) References Cited

U.S. PATENT DOCUMENTS

| 8,699,367 | B1 | 4/2014 | Gilbert |
| 2010/0039977 | A1* | 2/2010 | Hikari ................ H04L 47/10 370/312 |
| 2012/0243523 | A1 | 9/2012 | Liu |
| 2013/0051380 | A1 | 2/2013 | Lundgren |

(Continued)

FOREIGN PATENT DOCUMENTS

| CN | 101383991 A | 3/2009 |
| CN | 101771492 A | 7/2010 |
| EP | 2615760 B1 | 1/2018 |

*Primary Examiner* — Muhammad Raza
(74) *Attorney, Agent, or Firm* — Winston Hsu

(57) ABSTRACT

A method and apparatus for performing dynamic statistical period adjustment regarding rate adaption (RA) are provided. The method includes: collecting respective transmission results of multiple data packets to perform parallel processing, where the parallel processing includes statistical period control and RA control. The statistical period control includes: determining whether a first loop index reaches a monitored period threshold; performing first transmitting (TX) information statistics; calculating variance of TX information statistics results; and selectively adjusting a statistical period threshold. The RA control includes: determining whether a second loop index reaches the statistical period threshold; performing second TX information statistics; and performing the RA. The statistical period control may dynamically adjust the statistical period of the RA control, to enhance transmission efficiency of the wireless communications device.

10 Claims, 5 Drawing Sheets

(56) References Cited

U.S. PATENT DOCUMENTS

2013/0064183 A1* 3/2013 Zhu ............... H04W 52/12
  370/328
2018/0367290 A1* 12/2018 Jin ................ H04L 1/1867
2020/0344107 A1* 10/2020 Seely .............. H04L 1/0003

* cited by examiner

METHOD AND APPARATUS FOR PERFORMING DYNAMIC STATISTICAL PERIOD ADJUSTMENT REGARDING RATE ADAPTION

BACKGROUND OF THE INVENTION

1. Field of the Invention

The present invention is related to a wireless communications system, and more particularly, to a method and apparatus for performing dynamic statistical period adjustment regarding rate adaption (RA) applicable to a wireless communications device.

2. Description of the Prior Art

In a free communications channel such as a Wi-Fi channel, different communications systems may concurrently share a limited bandwidth, but may be unable to detect each other, so collision occurs easily. In addition, one or more devices within a conventional wireless communications system may perform rate adaption (RA) such as data rate switching, which also introduces some problems. For example, when a packet error rate (PER) is high, a transmitting (TX) side may reduce the data rate to try to make the receiving (RX) side receive data more easily. If the high PER is caused by insufficient sensitivity at the RX side, it is reasonable to reduce the data rate. If, however, the high PER is caused by excessive interference in the air (e.g. the data packets in the air are colliding with other signals), reducing the data rate may make each packet longer, making collision more likely to occur. More particularly, in the free communications channel such as the Wi-Fi channel, collisions are almost inevitable. Once collision occurs, it is difficult for the data packets being transmitted to be successfully received by the RX side, which may result in an increased PER, causing the RA mechanism to further reduce the data rate, such that each packet becomes longer and will be even more likely to experience collision, which further increases the PER. As a result, overall performance of the conventional wireless communications system is reduced.

Thus, there is a need for a novel method and associated architecture which can enhance the overall performance of the wireless communications system without introducing any side effects or in a way that is less likely to introduce side effects.

SUMMARY OF THE INVENTION

An objective of the present invention is to provide a method and apparatus for performing dynamic statistical period adjustment regarding rate adaption (RA), to solve the aforementioned problems.

Another objective of the present invention is to provide a method and apparatus for performing dynamic statistical period adjustment regarding RA, to enhance the overall performance of the wireless communications system without introducing any side effects or in a way that is less likely to introduce side effects.

At least one embodiment of the present invention provides a method for performing dynamic statistical period adjustment regarding RA, wherein the method is applicable to a wireless communications device. The method may comprise: collecting respective transmission results of multiple data packets to perform parallel processing, wherein the parallel processing comprises statistical period control and RA control. The statistical period control may comprise: determining whether a first loop index reaches a monitored period threshold, wherein the monitored period threshold corresponds to a monitored period; in response to the first loop index reaching the monitored period threshold, performing first transmitting (TX) information statistics in the monitored period; calculating variance of TX information statistics results, wherein the TX information statistics results comprise first statistics results of the first TX information statistics; and according to the variance, selectively adjusting a statistical period threshold for performing the RA control. The RA control may comprise: determining whether a second loop index reaches the statistical period threshold, wherein the statistical period threshold corresponds to a statistical period; in response to the second loop index reaching the statistical period threshold, performing second TX information statistics in the statistical period; and according to one or more second statistics results of the second TX information statistics, performing the RA. The statistical period control dynamically adjusts the statistical period of the RA control, to enhance transmission efficiency of the wireless communications device.

At least one embodiment of the present invention provides an apparatus for performing dynamic statistical period adjustment regarding RA, wherein the apparatus is applicable to a wireless communications device. The apparatus may comprise a processing circuit positioned in the wireless communications device. The processing circuit may be configured to control operations of the wireless communications device and collect respective transmission results of multiple data packets to perform parallel processing, wherein the parallel processing comprises statistical period control and RA control. The statistical period control may comprise: determining whether a first loop index reaches a monitored period threshold, wherein the monitored period threshold corresponds to a monitored period; in response to the first loop index reaching the monitored period threshold, performing first TX information statistics in the monitored period; calculating variance of TX information statistics results, wherein the TX information statistics results comprise first statistics results of the first TX information statistics; and according to the variance, selectively adjusting a statistical period threshold for performing the RA control. The RA control may comprise: determining whether a second loop index reaches the statistical period threshold, wherein the statistical period threshold corresponds to a statistical period; in response to the second loop index reaching the statistical period threshold, performing second TX information statistics in the statistical period; and according to one or more second statistics results of the second TX information statistics, performing the RA. The statistical period control dynamically adjusts the statistical period of the RA control, to enhance transmission efficiency of the wireless communications device.

By dynamically adjusting the statistical period, the present invention can perform proper control regarding the RA, to effectively reduce the occurrence of transmission failure due to signal interference; more particularly, the present invention can correspondingly reduce the probability of re-transmission and avoid a higher packet error rate (PER) caused by erroneous control of the RA, thereby greatly enhancing the overall performance of the wireless communications system under limited resources. In addition, implementation of related embodiments of the present invention will not greatly increase additional costs. Thus, the problems of the related art can be solved. In comparison with the related art, the present invention can optimize the performance of the wireless communications system without introducing any side effects or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
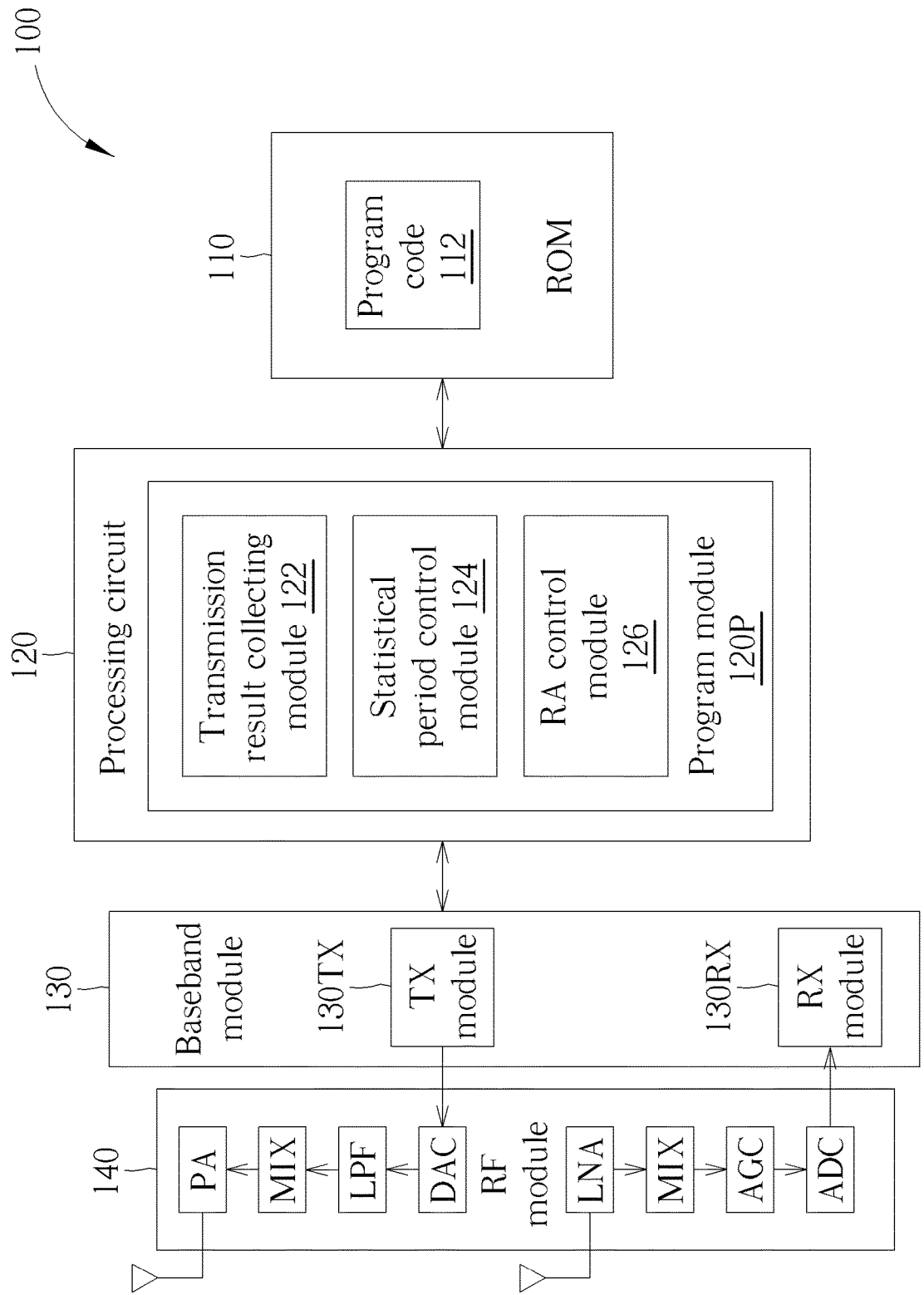
FIG. 1 is a diagram illustrating a wireless communications device according to an embodiment of the present invention.

FIG. 1 is a diagram illustrating a wireless communications device 100 according to an embodiment of the present invention. The wireless communications device 100 may comprise at least one memory (e.g. one or more memories) such as a read only memory (ROM) 110, a processing circuit 120, a baseband module 130 and a radio frequency (RF) module 140. The processing circuit 120 may be implemented by a microprocessor to execute multiple program modules 120P such as a transmission result collecting module 122, a statistical period control module 124, and a rate adaption (RA) control module 126 for controlling operations of the wireless communications device 100, and the ROM 110 may store a program code 112 for being loaded into the processing circuit 120 to act as the multiple program modules 120P, but the present invention is not limited thereto. In addition, the baseband module 130 may comprise a receiving (RX) module 130RX and a transmitting (TX) module 130TX. The above components may be coupled to one another as shown in FIG. 1, but the present invention is not limited thereto. For example, one or more additional components may be added or modified or removed in the architecture shown in FIG. 1, and/or connections between some components may vary. Furthermore, the RX module 130RX and the TX module 130TX may be coupled to an RX path and a TX path of the wireless communications device 100, respectively, where the RX path and the TX path are formed by a set of components (e.g. a low noise amplifier (LNA), a mixer (MIX), an automatic gain control (AGC) and an analog-to-digital converter (ADC)) and another set of components (e.g. a digital-to-analog converter (DAC), a low pass filter (LPF), a mixer (MIX) and a power amplifier (PA)) of the RF module 140, respectively, but the present invention is not limited thereto. The aforementioned at least one memory such as the ROM 110 may be configured to store information for being used by the processing circuit 120. The processing circuit 120 may be configured to control operations of the wireless communications device 100. The baseband module 130 may be configured to perform baseband processing. The RF module 140 may be configured to perform RF processing to allow the wireless communications device 100 to receive or transmit packets through antennas.

Based on the architecture shown in FIG. 1, the wireless communications device 100 may perform RA, and more particularly, may perform related operations conforming to Institute of Electrical and Electronics Engineers (IEEE) 802.11 specification and perform dynamic statistical period adjustment regarding the RA. As the wireless communications device 100 is equipped with a proper and robust determining mechanism, the present invention can prevent the problems of the related art, such as erroneous operations caused by erroneous determination. More particularly, the present invention can effectively reduce the impact of packet collision and other interference upon the RA, and guarantee transmission efficiency in a clean channel.

According to some embodiments, an apparatus for performing dynamic statistical period adjustment regarding the RA may comprise at least one portion (e.g. one portion or all) of the wireless communications device 100. For example, the apparatus may comprise a control circuit of the wireless communications device 100, and the control circuit may comprise the ROM 110 and the processing circuit 120, and may further comprise the baseband module 130 and the RF module 140, where the control circuit may be implemented as one or more integrated circuits or a chip set. In another example, the apparatus may comprise the whole wireless communications device 100.

Figure 2:
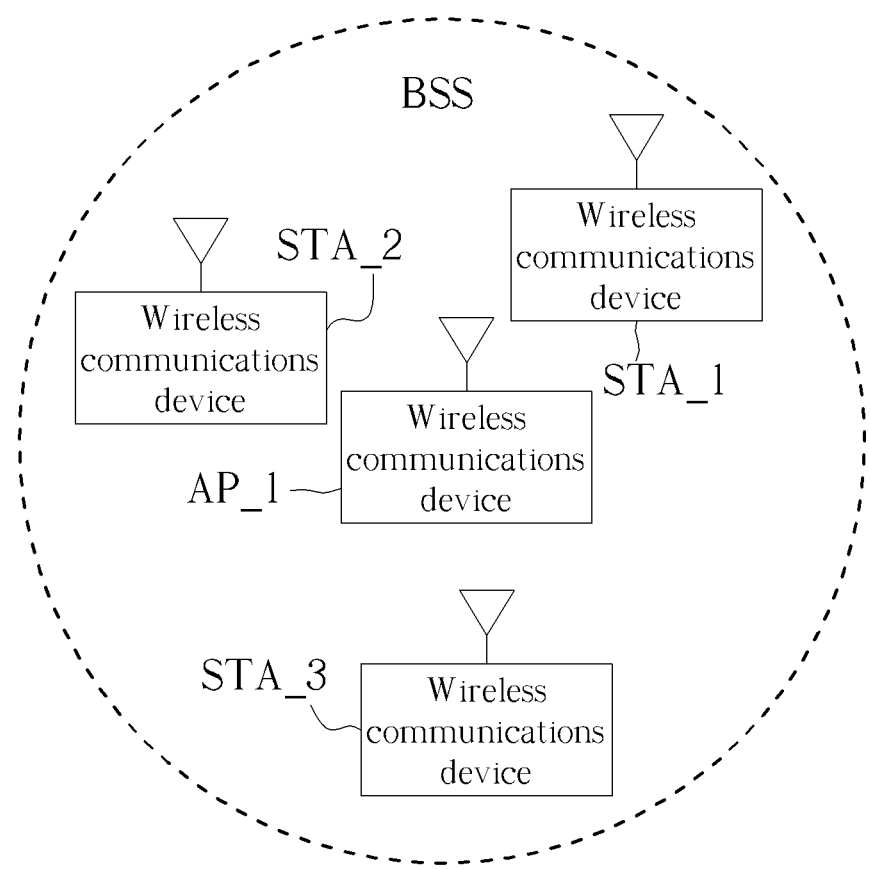
FIG. 2 illustrates a basic service set (BSS) of the wireless communications device shown in FIG. 1 according to an embodiment of the present invention.

FIG. 2 illustrates a basic service set (BSS) of the wireless communications device 100 shown in FIG. 1 according to an embodiment of the present invention. As shown in FIG. 2, the BSS may comprise wireless communications devices {AP_1, STA_1, STA_2, STA_3, . . . }, where the wireless communications device AP_1 may be implemented as an access point (AP), and the wireless communications devices {STA_1, STA_2, STA_3, . . . } may be implemented as stations (STAs). The wireless communications devices AP_1 and {STA_1, STA_2, STA_3, . . . } may be examples of the wireless communications device 100, but the present invention is not limited thereto.

Figure 3:
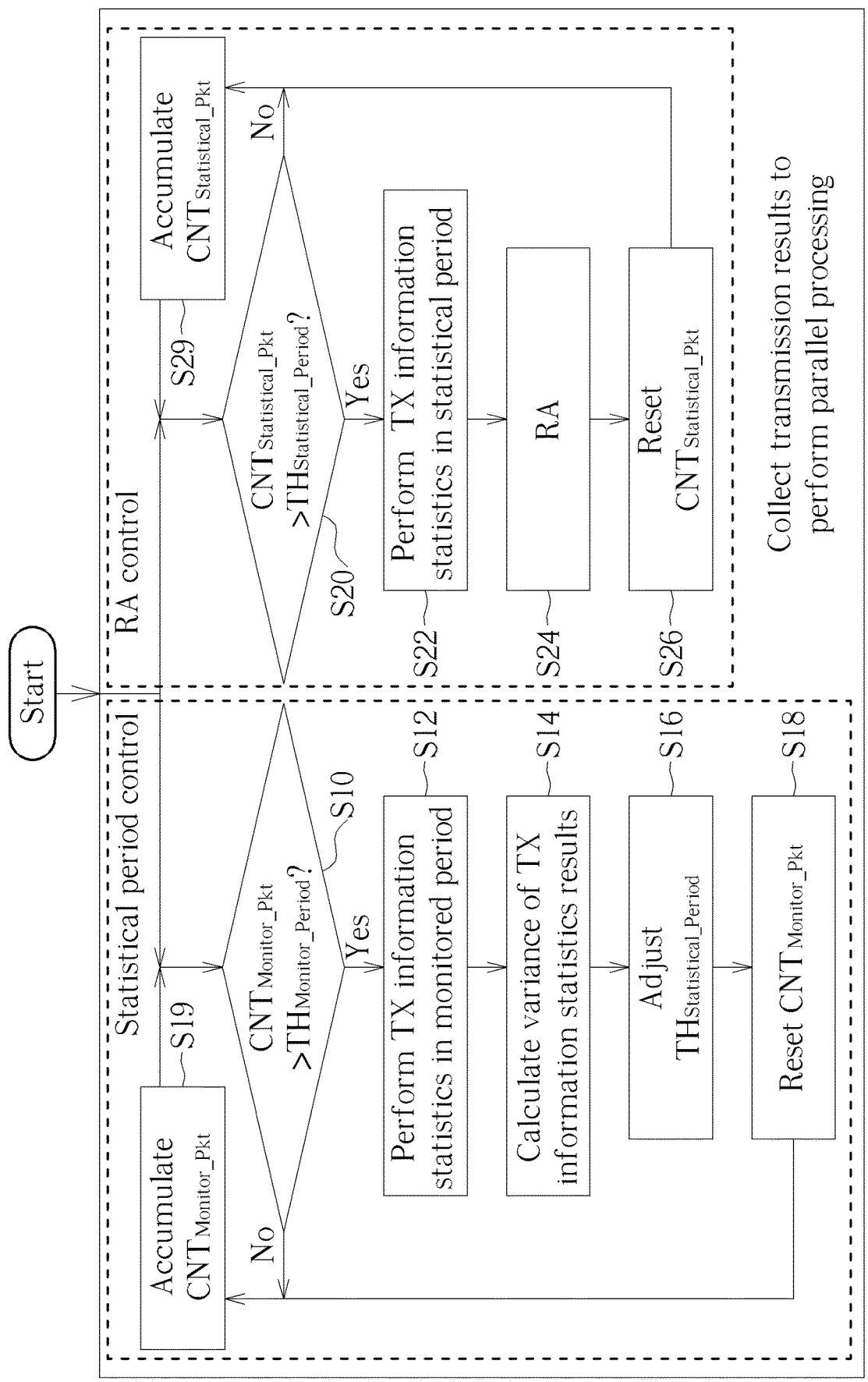
FIG. 3 is a flowchart illustrating a method for performing dynamic statistical period adjustment regarding rate adaption (RA) according to an embodiment of the present invention.

FIG. 3 is a flowchart illustrating a method for performing dynamic statistical period adjustment regarding the RA according to an embodiment of the present invention. The method is applicable to the wireless communications device 100, in particular, the architecture shown in FIG. 1 (e.g. the ROM 110, the processing circuit 120, etc.), and may be executed by the apparatus. For example, for multiple data packets transmitted from the wireless communications device 100 to the outside via the TX path, the wireless communications device 100 may play the role of a TX side, and one or more other wireless communications devices may play the role of an RX side.

As shown in FIG. 3, the processing circuit 120 may collect respective transmission results of the multiple data packets, such as an RX success status or an RX failure status (of the multiple data packets) indicated by respective acknowledgement (ACK) packets of the multiple data packets, to perform parallel processing, where these ACK packets may be generated by the RX side such as the one or more other wireless communications devices and received by the wireless communications device 100 through the RX path, and may respectively indicate whether these data packets (which have been transmitted) have been successfully received by the RX side such as the one or more other wireless communications devices. The parallel processing may comprise statistical period control and RA control respectively shown on the left-side and the right-side of FIG. 3. The transmission result collecting module 122 may collect these transmission results (e.g. success/failure statuses such as the aforementioned RX success or RX failure statuses), and the statistical period control module 124 and the RA control module 126 may accordingly perform parallel processing, and more particularly, perform the statistical period control and the RA control according to these transmission results. In addition, in the working flow shown in FIG. 3, respective determination results (e.g. "Yes" and "No") of some steps may indicate whether related conditions are satisfied. According to these determination results, the processing circuit 120 (e.g. the statistical period control module 124 and the RA control module 126) may execute corresponding subsequent steps. Furthermore, the processing circuit 120 (e.g. the TX result collecting module 122) may obtain, generate, and/or update a TX packet report to record these transmission results for performing the statistical period control and the RA control.

In Step S10, the processing circuit 120 (e.g. the statistical period control module 124) may determine whether a first loop index such as a monitored packet count $CNT_{Monitor\_Pkt}$ reaches (e.g. is greater than or equal to) a monitored period threshold $TH_{Monitor\_Period}$, where the monitored period threshold $TH_{Monitor\_Period}$ may correspond to a monitored period, and the first loop index such as the monitored packet count $CNT_{Monitor\_Pkt}$ may correspond to a monitored time interval, but the present invention is not limited thereto. If the determination is "Yes", Step S12 is entered; if "No", Step S19 is entered. According to this embodiment, determination of Step S10 may be implemented using the comparisons "$CNT_{Monitor\_Pkt} > TH_{Monitor\_Period}?$" or "$CNT_{Monitor\_Pkt} \geq TH_{Monitor\_period}?$" ("$CNT_{Monitor\_Pkt} > TH_{Monitor\_Period}?$" for brevity), but the present invention is not limited thereto. In some embodiments, the determination of Step S10 may be implemented by the comparison "$CNT_{Monitor\_Pkt} = TH_{Monitor\_Period}?$", which checks whether the two values are identical.

In Step S12, the processing circuit 120 (e.g. the statistical period control module 124) may perform first TX information statistics in the monitored period, and more particularly, calculate a series of packet error rates (PERs) according to the transmission results. For any PER within the series of PERs, the processing circuit 120 (e.g. the statistical period control module 124) may divide an error packet count (e.g. a count of data packets that are not successfully received, such as a count of data packets which the ACK packets indicate as RX failure) in a predetermined time interval by a total packet count of data packets that have been transmitted in the predetermined time interval, to generate a quotient as this PER, where the predetermined time interval is less than the monitored period, but the present invention is not limited thereto.

In Step S14, the processing circuit 120 (e.g. the statistical period control module 124) may calculate variance of TX information statistics results, and more particularly, calculate variance $VAR_{TxInfo}$ of the series of PERs, where the aforementioned TX information statistics results may comprise first statistics results of the first TX information statistics, such as the series of PERs.

In Step S16, according to the variance of the aforementioned TX information statistics results, such as the variance $VAR_{TxInfo}$, the processing circuit 120 (e.g. the statistical period control module 124) may selectively adjust a statistical period threshold $TH_{Statistical\_Period}$, and more particularly, update the statistical period threshold $TH_{Statistical\_Period}$ to act as one of multiple candidate statistical period thresholds for performing the RA control.

In Step S18, the processing circuit 120 (e.g. the statistical period control module 124) may reset the first loop index such as the monitored packet count $CNT_{Monitor\_Pkt}$, and more particularly, reset it to act as a predetermined value such as zero for proceeding to perform the statistical period control, but the present invention is not limited thereto. For example, the predetermined value may vary.

In Step S19, the processing circuit (e.g. the statistical period control module 124) may accumulate the first loop index such as the monitored packet count $CNT_{Monitor\_Pkt}$, and more particularly, increase the first loop index such as the monitored packet count $CNT_{Monitor\_Pkt}$ by a predetermined increment such as one.

In Step S20, the processing circuit (e.g. the RA control module 126) may determine whether a second loop index such as a statistical packet count $CNT_{Statistical\_Pkt}$ reaches (e.g. is greater than or equal to) the statistical period threshold $TH_{Statistical\_Period}$, where the statistical period threshold $TH_{Statistical\_Period}$ may correspond to a statistical period, and the second loop index such as the statistical packet count $CNT_{Statistical\_Pkt}$ may correspond to a statistical time interval, but the present invention is not limited thereto. If the determination is "Yes", Step S22 is entered; if "No", Step S29 is entered. According to this embodiment, determination of Step S20 may be implemented using the comparisons "$CNT_{Statistical\_Pkt} > TH_{Statistical\_Period}?$" or "$CNT_{Statistical\_Pkt} \geq TH_{Statistical\_Period}?$" ("$CNT_{Statistical\_Pkt} > TH_{Statistical\_Period}?$" for brevity), but the present invention is not limited thereto. In some embodiments, the determination of Step S10 may be implemented by the comparison "$CNT_{Statistical\_Pkt} = TH_{Statistical\_Period}?$"/which checks whether the two values are identical.

In Step S22, the processing circuit 120 (e.g. the RA control module 126) may perform second TX information statistics in the statistical period, and more particularly, calculate a PER according to the transmission results. The processing circuit 120 (e.g. the statistical period control module 124) may divide an error packet count (e.g. a count of data packets that are not successfully received, such as a count of data packets which the ACK packets indicate as RX failure) in the statistical period by a total packet count of data packets that have been transmitted in the statistical period, to generate a quotient as this PER, where the predetermined time interval may be equal to the statistical period, but the present invention is not limited thereto.

In Step S24, according to one or more second statistics results of the second TX information statistics, the processing circuit 120 (e.g. the RA control module 126) may perform the RA. More particularly, according to changes of a latest PER obtained from the RA control (such as the most recent PER obtained in Step S22) relative to one or more previous PER obtained from the RA control, the processing circuit 120 (e.g. the RA control module 126) may selectively perform data rate switching for controlling the wireless communications device 100, in order to adjust a data rate configured for performing packet transmission, where the one or more second statistics results of the second TX information statistics may represent the latest PER. For example, when the PER gets high, the processing circuit 120 (e.g. the RA control module 126) may reduce the data rate to make the RX side receive data easily; and when the PER gets low, the processing circuit 120 (e.g. the RA control module 126) may increase the data rate to enhance the transmission efficiency; but the present invention is not limited thereto.

In Step S26, the processing circuit 120 (e.g. the RA control module 126) may reset the second loop index such as the statistical packet count $\text{CNT}_{Statistical\_Pkt}$, and more particularly, may rest it as a predetermined value such as zero for proceeding to perform the RA control, but the present invention is not limited thereto. For example, the predetermined value may vary.

In Step S29, the processing circuit 120 (e.g. the RA control module 126) may accumulate the second loop index such as the statistical packet count $\text{CNT}_{Statistical\_Pkt}$, and more particularly, may increase the second loop index such as the statistical packet count $\text{CNT}_{Statistical\_Pkt}$ by a predetermined increment such as one.

For better comprehension, the method may be illustrated by the working flow shown in FIG. 3, but the present invention is not limited thereto. According to some embodiments, one or more steps may be added, deleted or modified in the working flow show in FIG. 3. For example, the operations of Step S10 to S19 and the operations of Step S20 to S29 may be alternately executed. In another example, at least one portion (e.g. one portion or all) of the operations of Step S10 to S19 and at least one portion (e.g. one portion or all) of the operations of Step S20 to S29 may be simultaneously executed.

The processing circuit 120 (e.g. the statistical period control module 124) may perform the first TX information statistics upon a certain type of TX information such as the PER to generate the first statistics results. More particularly, the first statistics results may represent the series of PERs, where the first statistics results may be configured to determine whether any packet collision occurs, but the present invention is not limited thereto. According to some embodiments, the processing circuit 120 (e.g. the statistical period control module 124) may perform the first TX information statistics upon at least one type (e.g. one or more types) of TX information to generate the first statistics results. Examples of the aforementioned at least one type of TX information may include, but are not limited to: TX PER such as the series of PERs, TX power, TX opportunity (TXOP), etc.

According to some embodiments, the first loop index and the second loop index may vary. For example, the monitored packet count $\text{CNT}_{Monitor\_Pkt}$ may be replaced with a monitored time $\text{TIME}_{Monitor\_Pkt}$, and the statistical packet count $\text{CNT}_{Statistical\_Pkt}$ may be replaced with a statistical time $\text{TIME}_{Statistical\_Pkt}$. More particularly, the monitored period threshold $\text{TH}_{Monitor\_Period}$ may indicate the monitored period and may represent a first predetermined time length, and the statistical period threshold $\text{TH}_{Statistical\_Period}$ may indicate the statistical period and may represent a second predetermined time length.

Figure 4:
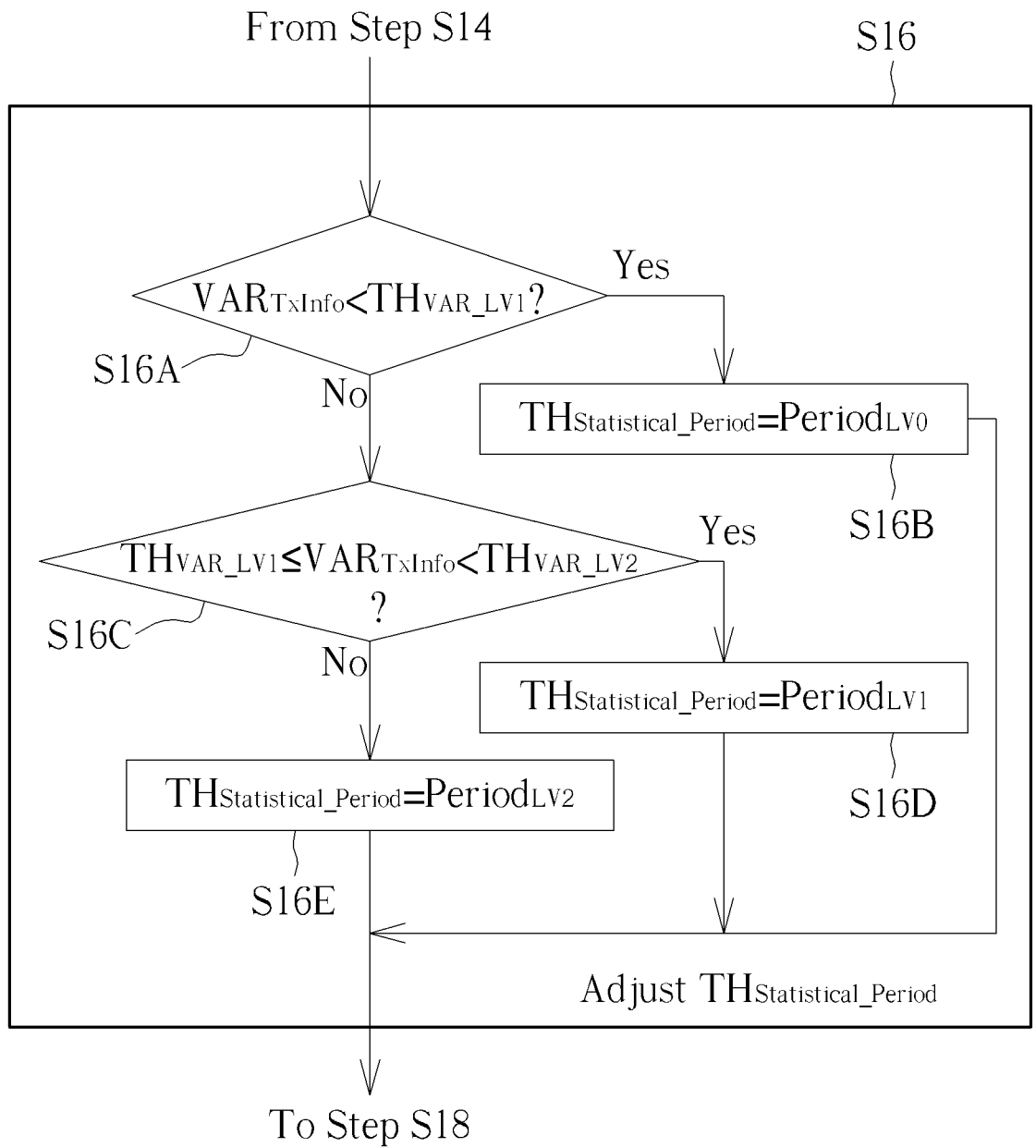
FIG. 4 is a control scheme of the method shown in FIG. 3 according to an embodiment of the present invention.

FIG. 4 is a control scheme of the method shown in FIG. 3 according to an embodiment of the present invention. Step S16 shown in FIG. 3 may comprise multiple sub-steps such as Steps S16A, S16B, S16C, S16D and S16E, and the processing circuit 120 (e.g. the statistical period control module 124) may determine whether the variance such as the variance $\text{VAR}_{TxInfo}$ falls in one of multiple predetermined variance ranges, to correspondingly update the statistical period threshold $\text{TH}_{Statistical\_Period}$, and more particularly, to update the statistical period threshold $\text{TH}_{Statistical\_Period}$ to act as a corresponding candidate statistical period threshold within the multiple candidate statistical period thresholds for performing the RA control, where the multiple candidate statistical period thresholds may comprise a first candidate statistical period threshold $\text{Period}_{LV0}$, a second candidate statistical period threshold $\text{Period}_{LV1}$ and a third candidate statistical period threshold $\text{Period}_{LV2}$, where $\text{Period}_{LV0}<\text{Period}_{LV1}<\text{Period}_{LV2}$, but the present invention is not limited thereto.

In Step S16A, the processing circuit 120 (e.g. the statistical period control module 124) may determine whether the variance $\text{VAR}_{TxInfo}$ falls in the first predetermined variance range such as a range less than the first candidate statistical period threshold $\text{Period}_{LV0}$ (labeled "$\text{VAR}_{TxInfo}<\text{TH}_{VAR\_LV1}$?" for brevity). If the determination is "Yes", Step S16B is entered; if "No", Step S16C is entered.

In Step S16B, in response to the variance $\text{VAR}_{TxInfo}$ falling in the first predetermined variance range, the processing circuit 120 (e.g. the statistical period control module 124) may set the statistical period threshold $\text{TH}_{Statistical\_Period}$ as the first candidate statistical period threshold $\text{Period}_{LV0}$.

In Step S16C, the processing circuit 120 (e.g. the statistical period control module 124) may determine whether the variance $\text{VAR}_{TxInfo}$ falls in a second predetermined variance range such as a range reaching (e.g. greater than or equal to) the first candidate statistical period threshold $\text{Period}_{LV0}$ and less than a second predetermined variance threshold $\text{TH}_{VAR\_LV2}$ (labeled "$\text{TH}_{VAR\_LV1} \leq \text{VAR}_{TxInfo}<\text{TH}_{VAR\_LV2}$?" for brevity). If the determination is "Yes", Step S16D is entered; if "No", i.e. the variance $\text{VAR}_{TxInfo}$ falls in a third predetermined variance range such as a range reaching (e.g. greater than or equal to) the second predetermined variance threshold $\text{TH}_{VAR\_LV2}$/Step S16E is entered.

In Step S16D, in response to the variance $\text{VAR}_{TxInfo}$ falling in the second predetermined variance range, the processing circuit 120 (e.g. the statistical period control module 124) may set the statistical period threshold $\text{TH}_{Statistical\_Period}$ as the second candidate statistical period threshold $\text{Period}_{LV1}$.

In Step S16E, in response to the variance $\text{VAR}_{TxInfo}$ falling in the third predetermined variance range, the processing circuit 120 (e.g. the statistical period control module 124) may set the statistical period threshold $\text{TH}_{Statistical\_Period}$ as the third candidate statistical period threshold $\text{Period}_{LV2}$.

According to some embodiments, the multiple predetermined variance ranges (such as the first predetermined variance range, the second predetermined variance range, the third predetermined variance range, etc.) may vary. For example, the number of the multiple predetermined variance ranges may vary, and the number of the multiple candidate statistical period thresholds may correspondingly vary; and/or sizes of the multiple predetermined variance ranges may vary, and values of the multiple candidate statistical period thresholds may correspondingly vary.

Figure 5:
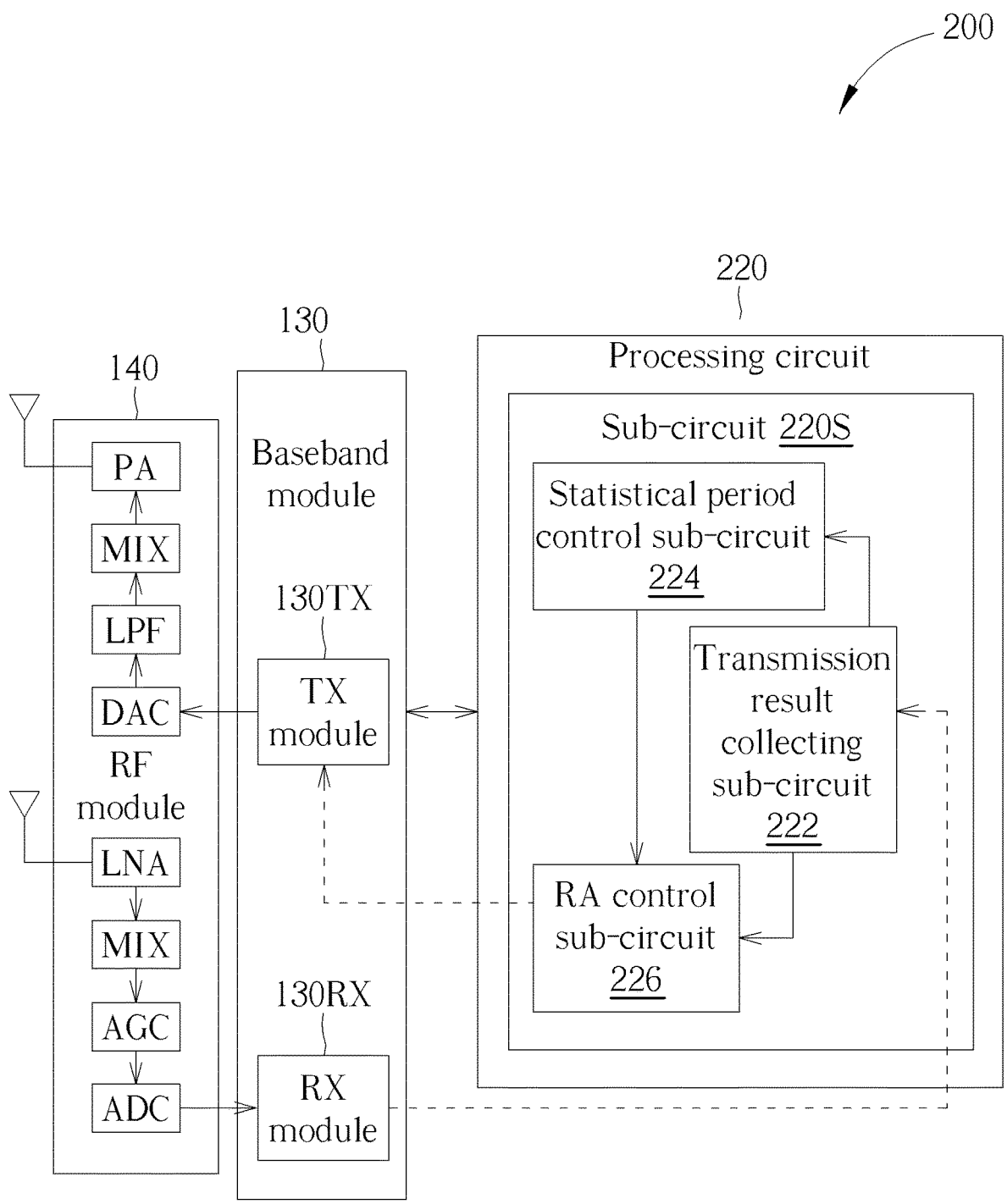
FIG. 5 is a diagram illustrating a wireless communications device 200 according to another embodiment of the present invention.

FIG. 5 is a diagram illustrating a wireless communications device 200 according to another embodiment of the present invention. In comparison with the architecture shown in FIG. 1, the processing circuit 120 and the program modules 120P running thereon such as the transmission result collecting module 122, the statistical period control module 124 and the RA control module 126 may be replaced with a processing circuit 220 and sub-circuits 220S thereof such as a transmission result collecting sub-circuit 222, a statistical period control sub-circuit 224 and an RA control sub-circuit 226, for executing the operations of the method. For example, the processing circuit 220 may be implemented by an application-specific integrated circuit (ASIC), but the present invention is not limited thereto. Similar descriptions of this embodiment are not repeated for brevity.

The transmission result collecting module 122, the statistical period control module 124 and the RA control module 126 running on the processing circuit 120 may allow the processing circuit to perform the same operations as the transmission result collecting sub-circuit 222, the statistical period control sub-circuit 224 and the RA control sub-circuit 226, respectively, and may therefore be regarded as a transmission result collecting sub-circuit, a statistical period control sub-circuit and an RA control sub-circuit, but the present invention is not limited thereto.

Table 1 shows an example of the data rate relative to high throughput (HT) mode modulation and coding scheme (MCS) (HT MCS) indexes, spatial streams, and modulation and coding under some conditions, where these conditions may comprise guard interval GI=800 ns, bandwidth BW=20 MHz, etc., but the present invention is not limited thereto. When needed, the apparatus of the present invention such as the architectures respectively shown in FIG. 1 and FIG. 5 can adjust the guard interval GI and the bandwidth BW regarding band control, and may execute Step S24 according to a corresponding table such as Table 1 to perform the RA operations. More particularly, the apparatus of the present invention can switch between multiple index candidate values of the HT MCS indexes, to select a certain candidate value from multiple candidate values of the data rate according to the corresponding table to act as a latest value of the data rate.

TABLE 1

| HT MCS index | Spatial stream | Modulation and coding | Data rage (Mbit/s) |
|---|---|---|---|
| 0 | 1 | BPSK 1/2 | 6.5 |
| 1 | 1 | QPSK 1/2 | 13 |
| 2 | 1 | QPSK 3/4 | 19.5 |
| 3 | 1 | 16-QAM 1/2 | 26 |
| 4 | 1 | 16-QAM 3/4 | 39 |
| 5 | 1 | 64-QAM 2/3 | 52 |
| 6 | 1 | 64-QAM 3/4 | 58.5 |
| 7 | 1 | 64-QAM 5/6 | 65 |
| 8 | 2 | BPSK 1/2 | 13 |
| 9 | 2 | QPSK 1/2 | 26 |
| 10 | 2 | QPSK 3/4 | 39 |
| 11 | 2 | 16-QAM 1/2 | 52 |
| 12 | 2 | 16-QAM 3/4 | 78 |
| 13 | 2 | 64-QAM 2/3 | 104 |
| 14 | 2 | 64-QAM 3/4 | 117 |
| 15 | 2 | 64-QAM 5/6 | 130 |
| 16 | 3 | BPSK 1/2 | 19.5 |
| 17 | 3 | QPSK 1/2 | 39 |
| 18 | 3 | QPSK 3/4 | 58.5 |
| 19 | 3 | 16-QAM 1/2 | 78 |
| 20 | 3 | 16-QAM 3/4 | 117 |
| 21 | 3 | 64-QAM 2/3 | 156 |
| 22 | 3 | 64-QAM 3/4 | 175.5 |
| 23 | 3 | 64-QAM 5/6 | 195 |
| 24 | 4 | BPSK 1/2 | 26 |
| 25 | 4 | QPSK 1/2 | 52 |
| 26 | 4 | QPSK 3/4 | 78 |
| 27 | 4 | 16-QAM 1/2 | 104 |
| 28 | 4 | 16-QAM 3/4 | 156 |
| 29 | 4 | 64-QAM 2/3 | 208 |
| 30 | 4 | 64-QAM 3/4 | 234 |
| 31 | 4 | 64-QAM 5/6 | 260 |

Some detailed implementation regarding the method is further illustrated as follows. According to some embodiments, the apparatus (e.g. the processing circuit 120 or 220) may perform the statistical period control to distinguish different conditions according to the variance. Under a first condition where the PER is too high due to insufficient sensitivity at the RX side, when adopting the same TX rate such as a certain data rate within Table 1 and calculating the PER once every certain number of packets (e.g. 1000 packets) are transmitted, the apparatus may detect that the PERs get worse in a uniform manner. As this phenomenon is related to RX capability, the respective detected PERs are not very different from each other. Under a second condition where the PER is too high due to packet collision, when adopting the same TX rate such as the same data rate within Table 1 and calculating the PER once every the same number of packets (e.g. 1000 packets) are transmitted, the apparatus may detect that the PERs have irregular and obvious variation. As this phenomenon is related to random collision, respective detected PERs are quite irregular.

As the variance such as the variance $VAR_{TxInfo}$ may indicate distribution (amount of difference therein) between respective detected PERs, the apparatus (e.g. the processing circuit 120 or 220) may distinguish the above two conditions according to the variance and correspondingly update (e.g. dynamically update) the statistical period threshold $TH_{Statistical\_Period}$ to guarantee correctness of the RA control. For example, under the second condition, the apparatus (e.g. the processing circuit 120 or 220) may adjust the statistical period threshold $TH_{Statistical\_Period}$ to be a greater value such as the third candidate statistical period threshold $Period_{LV2}$, and more particularly, may dilute or mitigate impact of the packet collision regarding the PER by increasing the statistical period threshold $TH_{Statistical\_Period}$ (e.g. calculating the PER once every 1000 packets are transmitted to calculating the PER once every 5000 packets are transmitted), to reduce the probability of lowering the data rate. In another example, under the first condition, the apparatus (e.g. the processing circuit 120 or 220) may adjust the statistical period threshold $TH_{Statistical\_Period}$ to be a lower value such as the first candidate statistical period threshold $Period_{LV0}$, and more particularly, may increase response speed of the RA through reducing the statistical period threshold $TH_{Statistical\_Period}$ (e.g. calculating the PER once every 1000 packets are transmitted to calculating the PER once every 500 packets are transmitted). Similar descriptions of this embodiment are not repeated for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing dynamic statistical period adjustment regarding rate adaption (RA), applicable to a wireless communications device, the method comprising:
    collecting, by a hardware processing circuit, positioned in a hardware wireless communications device, respective transmission results of multiple data packets to perform parallel processing and control operations of the hardware wireless communications device, wherein the parallel processing comprises statistical period control and RA control, wherein:
    the statistical period control comprises:
        determining a first loop index reaches a monitored period threshold, wherein the monitored period threshold corresponds to a monitored period, the first loop index represents a monitored packet count, and the monitored period threshold indicates the monitored period and represents a first predetermined time length;

in response to the first loop index reaching the monitored period threshold, performing first transmitting (TX) information statistics in the monitored period;

calculating variance of TX information statistics results, wherein the TX information statistics results comprise first statistics results of the first TX information statistics; and according to the variance, selectively adjusting a statistical period threshold for performing the RA control;

wherein the first statistics results of the first TX information statistics represent a series of packet error rates (PERs), and the variance represents variance of the series of PERs; and the RA control comprises:

determining a second loop index reaches the statistical period threshold, wherein the statistical period threshold corresponds to a statistical period, the second loop index represents a statistical packet count, and the statistical period threshold indicates the statistical period and represents a second predetermined time length;

in response to the second loop index reaching the statistical period threshold, performing second TX information statistics in the statistical period; and according to one or more second statistics results of the second TX information statistics, performing the RA, wherein the one or more second statistics results of the second TX information statistics represent a latest PER;

wherein the statistical period control dynamically adjusts the statistical period of the RA control, to enhance transmission efficiency of the wireless communications device.

2. The method of claim 1, wherein the step of selectively adjusting the statistical period threshold according to the variance for performing the RA control further comprises:

according to the variance, updating the statistical period threshold to act as one of multiple candidate statistical period thresholds for performing the RA control.

3. The method of claim 2, wherein the step of selectively adjusting the statistical period threshold according to the variance for performing the RA control further comprises:

determining whether the variance falls in one of multiple predetermined variance ranges, to correspondingly update the statistical period threshold for performing the RA control.

4. The method of claim 1, wherein:

the statistical period control further comprises:

after executing the step of selectively adjusting the statistical period threshold according to the variance for performing the RA control, resetting the first loop index for proceeding to perform the statistical period control; and the RA control further comprises:

after executing the step of performing the RA according to the one or more second statistics results of the second TX information statistics, resetting the second loop index for proceeding to perform the RA control.

5. The method of claim 1, wherein:

the statistical period control further comprises:

accumulating the first loop index; and the RA control further comprises:

accumulating the second loop index.

6. The method of claim 1, wherein the first loop index represents a monitored time, and the second loop index represents a statistical time.

7. An apparatus for performing dynamic statistical period adjustment regarding rate adaption (RA), applicable to a hardware wireless communications device, the apparatus comprising:

a hardware processing circuit, positioned in the hardware wireless communications device, configured to control operations of the hardware wireless communications device and collect respective transmission results of multiple data packets to perform parallel processing, wherein the parallel processing comprises statistical period control and RA control, wherein:

the statistical period control comprises:

the hardware processing circuit determines a first loop index reaches a monitored period threshold, wherein the monitored period threshold corresponds to a monitored period, the first loop index represents a monitored packet count, and the monitored period threshold indicates the monitored period and represents a first predetermined time length;

in response to the first loop index reaching the monitored period threshold, the hardware processing circuit performs first transmitting (TX) information statistics in the monitored period;

the hardware processing circuit calculates variance of TX information statistics results, wherein the TX information statistics results comprise first statistics results of the first TX information statistics; and according to the variance, the hardware processing circuit selectively adjusts a statistical period threshold for performing the RA control;

wherein the first statistics results of the first TX information statistics represent a series of packet error rates (PERs), and the variance represents variance of the series of PERs; and the RA control comprises:

the hardware processing circuit determines a second loop index reaches the statistical period threshold, wherein the statistical period threshold corresponds to a statistical period, the second loop index represents a statistical packet count, and the statistical period threshold indicates the statistical period and represents a second predetermined time length;

in response to the second loop index reaching the statistical period threshold, the hardware processing circuit performs second TX information statistics in the statistical period; and according to one or more second statistics results of the second TX information statistics, the hardware processing circuit performs the RA, wherein the one or more second statistics results of the second TX information statistics represent a latest PER;

wherein the statistical period control dynamically adjusts the statistical period of the RA control, to enhance transmission efficiency of the wireless communications device.

8. The apparatus of claim 7, wherein the processing circuit executes multiple program modules to control the operations of the wireless communications device;

and the apparatus further comprises:

a read only memory (ROM), configured to store a program code for being loaded into the processing circuit to act as the multiple program modules, wherein the multiple program modules comprise:
- a transmission result collecting module, configured to collect the respective transmission results of the multiple data packets;
- a statistical period control module, configured to perform the statistical period control; and
- an RA control module, configured to perform the RA control.

9. The apparatus of claim 7, wherein the processing circuit comprises multiple sub-circuits; and the multiple sub-circuits comprise:
- a transmission result collecting circuit, configured to collect the respective transmission results of the multiple data packets;
- a statistical period control sub-circuit, coupled to the transmission result collecting circuit, configured to perform the statistical period control; and
- an RA control sub-circuit, coupled to the transmission result collecting circuit and the statistical period control sub-circuit, configured to perform the RA control.

10. The apparatus of claim 7, further comprising:
- a baseband module, coupled to the processing circuit, configured to perform baseband processing, wherein a receiving (RX) module and a TX module of the baseband module are coupled to an RX path and a TX path of the wireless communications device, respectively; and
- a radio frequency (RF) module, coupled to the baseband module, configured to perform RF processing, wherein the RX path and the TX path are formed by a set of components and another set of components of the RF module, respectively.

* * * * *